United States Patent
Danforth et al.

(10) Patent No.: US 8,281,568 B2
(45) Date of Patent: Oct. 9, 2012

(54) CARTRIDGE-LOADED ROCKET MOTOR WITH CASTELLATED GRAIN SEGMENTS

(75) Inventors: Jeremy Danforth, Tucson, AZ (US); Richard D. Loehr, Tucson, AZ (US)

(73) Assignee: Raytheon Company, Waltham, MA (US)

( * ) Notice: Subject to any disclaimer, the term of this patent is extended or adjusted under 35 U.S.C. 154(b) by 657 days.

(21) Appl. No.: 12/481,470

(22) Filed: Jun. 9, 2009

(65) Prior Publication Data

US 2010/0307131 A1 Dec. 9, 2010

(51) Int. Cl.
*F02K 9/10* (2006.01)
*F02K 9/08* (2006.01)

(52) U.S. Cl. ............. 60/253; 60/255; 102/288; 102/291

(58) Field of Classification Search .................... 60/253, 60/255, 256; 102/287, 291, 288
See application file for complete search history.

(56) References Cited

U.S. PATENT DOCUMENTS

| | | | | |
|---|---|---|---|---|
| 2,987,881 | A | * | 6/1961 | Mullane .......................... 60/255 |
| 3,048,112 | A | * | 8/1962 | Shope ............................. 60/255 |
| 3,088,273 | A | * | 5/1963 | Adelman et al. ................ 60/253 |
| 3,316,718 | A | * | 5/1967 | Webb .............................. 60/255 |
| 3,713,395 | A | | 1/1973 | Carpenter et al. |
| 4,408,534 | A | * | 10/1983 | Araki et al. .................... 102/291 |
| 5,101,730 | A | * | 4/1992 | Bender et al. ................. 102/288 |
| 5,309,712 | A | * | 5/1994 | Mund, Jr. ....................... 60/253 |
| 5,551,343 | A | * | 9/1996 | Hock et al. .................... 102/288 |
| 5,708,229 | A | * | 1/1998 | Betts et al. .................... 102/289 |
| 6,352,030 | B1 | * | 3/2002 | Doll et al. ..................... 102/291 |
| 6,354,075 | B1 | | 3/2002 | Johnson et al. |
| 7,469,640 | B2 | * | 12/2008 | Nielson et al. ................ 102/289 |

* cited by examiner

*Primary Examiner* — Ted Kim
(74) *Attorney, Agent, or Firm* — Renner, Otto, Boisselle & Sklar, LLP

(57) ABSTRACT

A solid fuel rocket motor, a castellated propellant cartridge and a method of controlling a pressure differential in a cartridge-loaded rocket motor are disclosed. The rocket motor may include a housing having an inside surface, a plurality of propellant cartridges disposed within the housing, an igniter disposed to ignite propellant material within the propellant cartridges, and a nozzle disposed to exhaust combustion gases out of the housing. At least some of the propellant cartridges may be castellated propellant cartridges.

17 Claims, 5 Drawing Sheets

US 8,281,568 B2

CARTRIDGE-LOADED ROCKET MOTOR WITH CASTELLATED GRAIN SEGMENTS

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by anyone of the patent disclosure as it appears in the Patent and Trademark Office patent files or records, but otherwise reserves all copyright and trade dress rights whatsoever.

BACKGROUND

1. Field

This disclosure relates to solid fuel rocket motors, and particularly to cartridge-loaded solid fuel rocket motors.

2. Description of the Related Art

Solid fuel rocket motors are commonly used in various configurations to propel rockets and missiles. Small solid fuel rocket motors may also be used to control the attitude and steering of a missile, rocket, or other projectile. Small solid fuel rocket motors used to control attitude are commonly called divert thrusters. Solid fuel rocket motors may also be used to turn a vertically-launched missile or rocket into near-horizontal flight. Such rocket motors are commonly called pitch-over thrusters.

The thrust or force produced by a rocket motor is given by the equation $$F = m_p * U_e + (P_e - P_a) * A_e$$

where
  $m_p$=propellant mass flow rate, and
  $P_e$=Nozzle exit pressure
  $P_a$=Ambient pressure
  $A_e$=Nozzle exit area
  $U_e$=gas velocity at nozzle exit plane.

The propellant mass flow rate mp is given by the equation $$m_p = A_p * R_b * P_p$$

where
  $A_p$=propellant surface area,
  $R_b$=propellant burn rate, and
  $P_p$=propellant density.

Thus the propellant surface area $A_p$ is one of the factors that may be used to determine the thrust produced by a solid fuel rocket.

The force produced by a rocket motor results in a linear or angular acceleration of the missile or other body propelled by the rocket motor. The net change in the linear or angular velocity of the missile or other body is proportional to the force produced by the motor integrated over time. The time integral of the force produced by a rocket motor is commonly called the "impulse" of the motor.

Throughout this description, elements appearing in figures are assigned three-digit reference designators, where the most significant digit is the figure number and the two least significant digits are specific to the element. An element that is not described in conjunction with a figure may be presumed to have the same characteristics and function as a previously-described element having a reference designator with the same least significant digits.

DETAILED DESCRIPTION

Description of Apparatus

Throughout this patent, the term "essentially" means "within the limits of reasonable manufacturing tolerances and processes". For example, an "essentially cylindrical" shape may deviate from a perfect cylinder due to manufacturing tolerances and an "essentially square" shape may have rounded corners to facilitate manufacturing.

Figure 1:
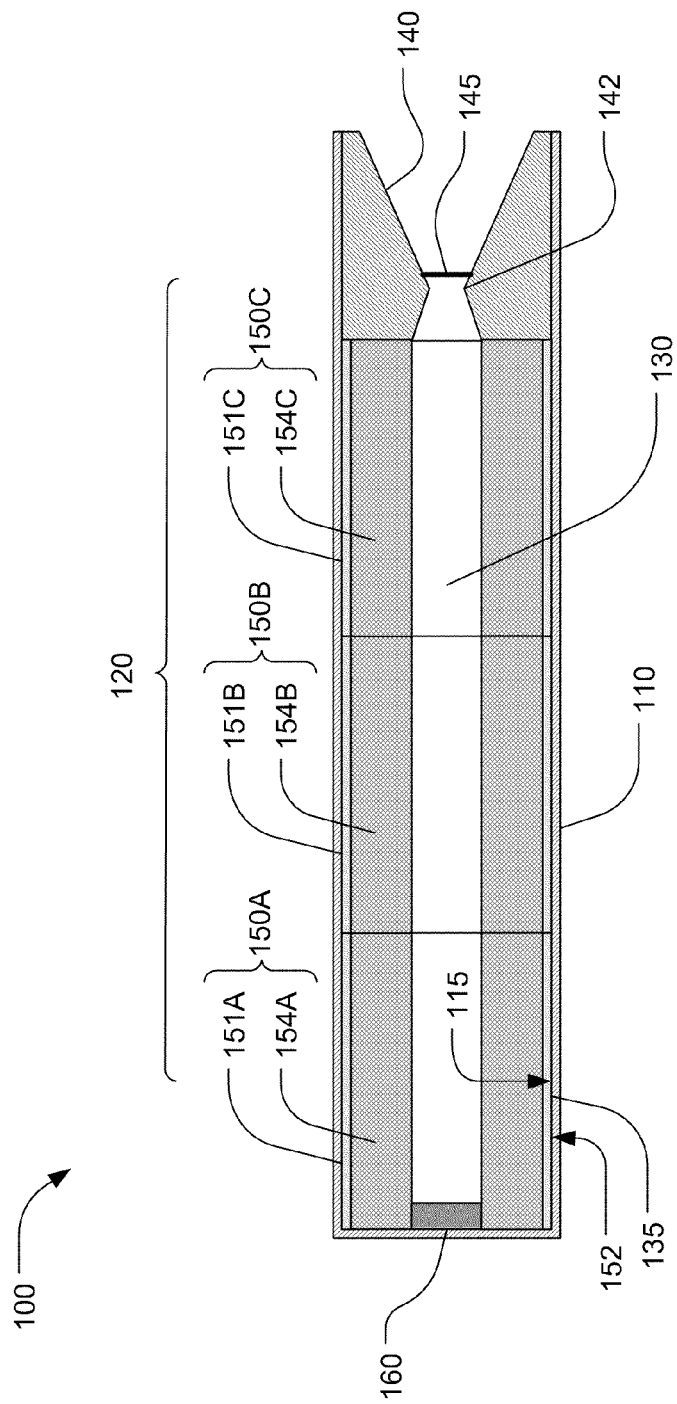
FIG. 1 is a cross-sectional schematic view of a solid fuel rocket motor.

Referring now to the cross-sectional schematic view of FIG. 1, an exemplary rocket motor 100 may include a housing 110, a solid fuel propellant charge 120 having a longitudinal opening 130, a nozzle 140, and an igniter 160. The solid fuel propellant charge 120 is commonly termed the "grain", and this term will be used within this description. Note that the term "grain" is used to describe the propellant charge 120 as a whole, but does not refer to the weight of the propellant charge, the particle size of the material composing the propellant charge, or the surface texture of the propellant charge.

Although the housing 110 is shown schematically in FIG. 1 as a single piece, the housing may be composed of multiple pieces that are connected, for example, by threaded joints. The housing may be fabricated from a metal material and may be adapted to contain the high gas pressure created within the rocket motor when the grain is ignited. The housing may include a combination of materials. For example, the housing may include an outer pressure barrel with an inner liner of a high temperature metal and/or an insulator layer.

FIG. 1 is an example of a so-called "cartridge-loaded" rocket motor where the grain 120 is fabricated external to the housing 110 and then loaded into the housing 110 during assembly of the rocket motor 100. In the example of FIG. 1, the grain 120 is composed of three propellant cartridges 150A, 150B, 150C. A rocket motor may have more or fewer than three propellant cartridges. Each of the propellant cartridges 150A, 150B, 150C may include a solid fuel material 154A, 154B, 154C within a case 151A, 151B, 151C. Propellant cartridges are commonly cylindrical in shape, but other shapes may be used.

In order to increase the surface area of the grain 120 to provide higher thrust, a longitudinal cavity 130 may be formed in the grain 120. The longitudinal cavity 130 may pass through each of the propellant cartridges 150A, 150B, 150C. The longitudinal cavity 130 may be centered on the longitudinal axis of the housing 110. Once the grain 120 is ignited by the igniter 160, the burning area may rapidly spread to include the entire surface of the longitudinal cavity 130. A grain with a longitudinal cavity, such as grain 120 with cavity 130, may be termed a "center-perforated grain" or an "inside burning grain". Although not shown in FIG. 1, the longitudinal cavity within each propellant cartridge 150A, 150B, 150C may be slightly tapered to facilitate removal of a mandrel used to form the solid fuel material 154A, 154B, 154C.

The igniter 160 may be a small charge of flammable material that, when burned, releases a predetermined amount of hot combustion gases. The combustion of the igniter may be initiated, for example, by an electric current flowing through a heater wire adjacent to, or embedded in, the flammable igniter material. In order to ignite the grain 120, the temperature and pressure of the gases produced by the igniter 160 must both exceed predetermined values. To allow pressure to build within the cavity 130, and thus facilitate ignition of the grain 120, the longitudinal cavity 130 may be sealed by an environmental seal 145. The environmental seal 145 may also serve to protect the grain from environmental effects, such as humidity and precipitation.

As shown in FIG. 1, the environmental seal 145 may be disposed at or near the portion of the nozzle 140 having the smallest cross-sectional area, commonly termed the throat 142. The environmental seal 145 may be disposed at other locations within the nozzle 140.

The environmental seal 145 may be designed to rupture or blow free from the motor after the pressure within the longitudinal cavity 130 exceeds a predetermined pressure level, which may be, for example, between 100 and 5000 pounds per square inch (PSI). For example, the environmental seal 145 may be retained in the nozzle by means of shear pins that fracture when the pressure exceeds the predetermined level. The environmental seal 145 may be a burst disc having controlled structural weakness that allows the burst disc to rupture in a controlled manner when the pressure exceeds the predetermined level.

To reduce the time required to ignite the entire surface of the grain 120, the longitudinal cavity 130 may be pressurized with air or another gas to an initial pressure level during manufacture. For example, the initial pressure in the longitudinal cavity 130 prior to ignition may be 500 to 2000 PSI. In this case, the environmental seal 145 may be designed to retain the initial pressure level indefinitely and to rupture at a substantially higher pressure level after the grain 120 is ignited.

Although the propellant cartridges 150A, 150B, 150C may fit closely within the housing 110, there may be small interstitial spaces 135 between outside surfaces 152 of the cases 151A, 151B, 151C and an inside surface 115 of the housing 110. When the grain 120 is ignited, the gas pressure in the longitudinal cavity 130 may rise abruptly such that the gas pressure in the longitudinal cavity 130 may be substantially higher than the gas pressure in the interstitial spaces 135 outside of the propellant cartridges. The pressure differential between the longitudinal cavity 130 and the interstitial spaces 135 may cause the propellant cartridges 150A, 150B, 150C to flex outwards. Excessive flexing of the propellant cartridges 150A, 150B, 150C may result in cracking of the solid fuel material 154A, 154B, 154C and, in the worst case, catastrophic failure of the rocket motor.

To minimize flexing of propellant cartridges, cartridge-loaded rocket motors may incorporate spacers at the ends of and/or between propellant cartridges. The spacers may be adapted to hold the propellant cartridges slightly apart and thus provide passages for gas from the longitudinal cavity to flow to the outside of the propellant cartridges, thus quickly equalizing the gas pressure inside and outside the cartridges.

Figure 2:
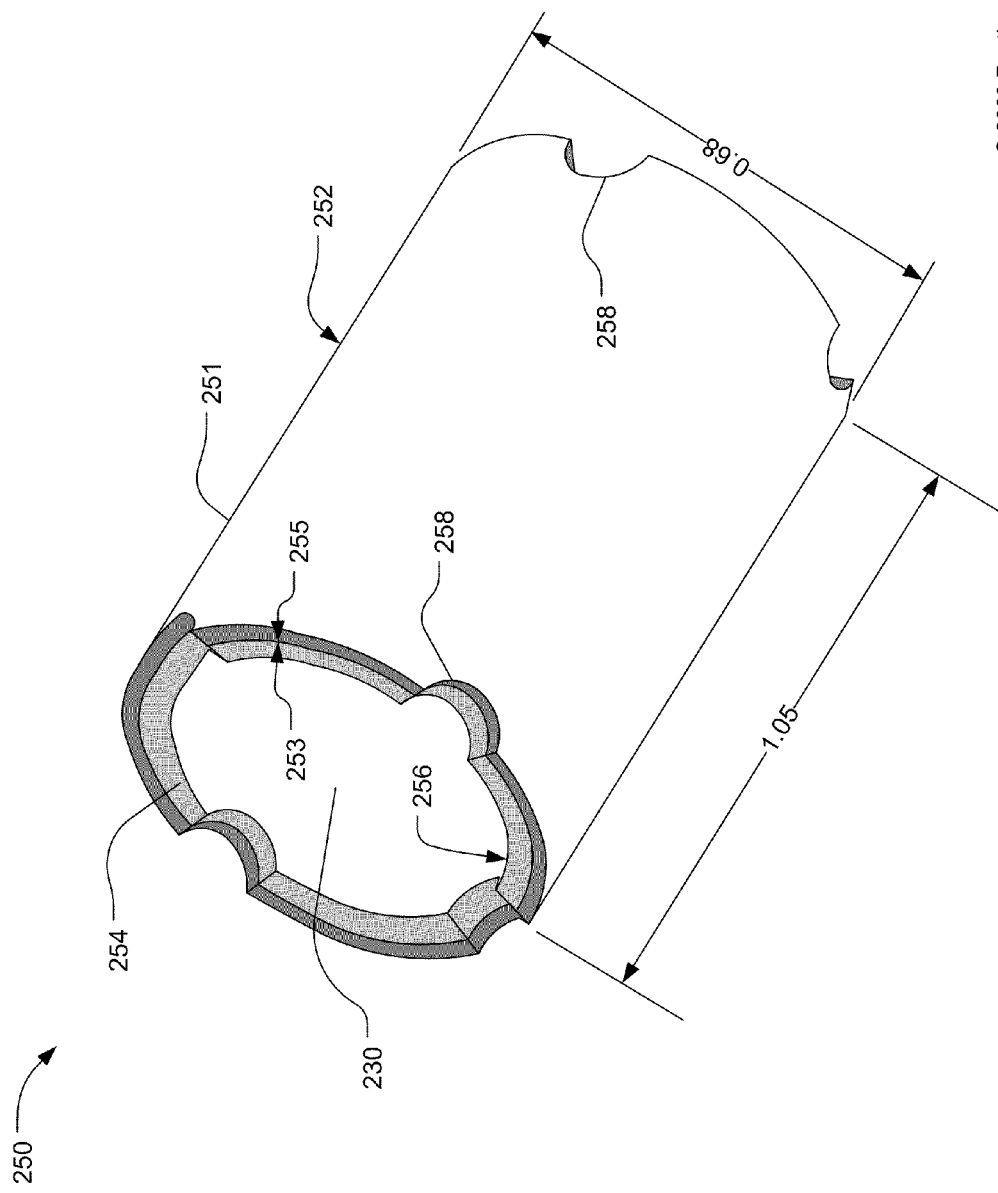
FIG. 2 is perspective view of a castellated grain cartridge.

FIG. 2 is a perspective view of a propellant cartridge 250. The propellant cartridge 250 may include an open-ended essentially cylindrical case 251 filled with an annular cylinder of propellant material 254. The case 251 may have an outside surface 252 and an inside surface 253.

The propellant material 254 may have an outside surface 255 proximate to the inside surface 253 of the case 251. The outside surface 255 of the propellant material 254 may be in direct contact with the inside surface 253 of the case 251. The outside surface 255 of the propellant material 254 may be coupled to the inside surface 253 by an intervening material such as, for example, an adhesive layer. The propellant material 254 may have an inside surface 256 facing a longitudinal cavity 230, devoid of propellant material, extending through a length of the propellant cartridge 250. The longitudinal cavity 230 may have an essentially circular cross-section or some other cross-sectional shape. The longitudinal cavity 230 may taper slightly along the length of the propellant cartridge 250.

One or both ends of the propellant cartridge 250 may be castellated, which is to say that castellations 258 may be cut into one or both ends such that the propellant cartridge resembles the parapets of a medieval castle. The castellations 258 may be radial grooves, slots, or notches formed at one or both ends of the propellant cartridge 250.

The castellations 258 may have an essentially semi-circular cross sectional shape as shown in FIG. 2. A castellated propellant cartridge may have castellations with an essentially square cross sectional shape such as the castellations 358A in FIG. 3A or castellations with an essentially triangular cross-sectional shape such as the castellations 358B in FIG. 3B. The castellations 258 may have some other shape.

Figure 3B:
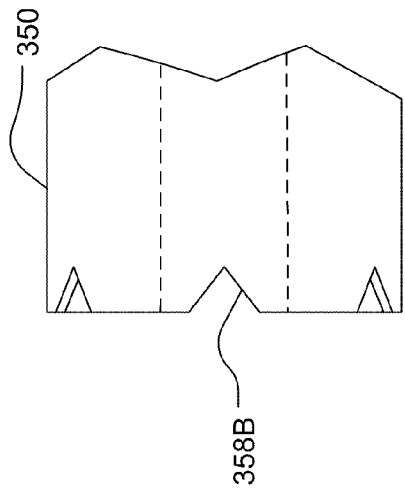
FIG. 3B is a partial side view of a castellated grain cartridge.
Figure 3A:
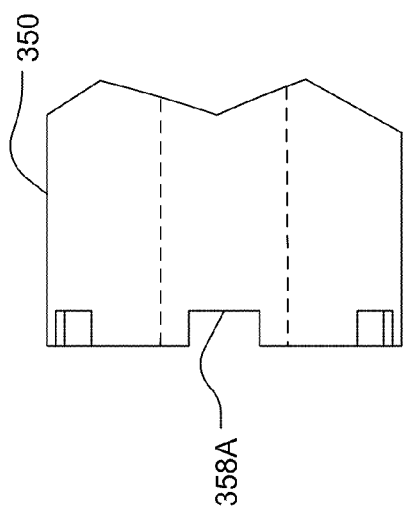
FIG. 3A is a partial side view of a castellated grain cartridge.

The castellations may be adapted to allow combustion gases to flow from the longitudinal cavity 230 to the outside of the case 251 when the propellant cartridge 250 is ignited within a rocket motor such as the rocket motor 100. The rate at which combustion gases flow from the longitudinal cavity 230 to the outside of the case 251 may depend, at least in part, on the size and number of the castellations 258. There may be four castellations at each end of a propellant cartridge as shown in FIG. 2, or six castellations at one or both ends of a propellant cartridge as shown in FIGS. 3A and 3B, or some other number of castellations per propellant cartridge.

The case 251 may be a metal material such as aluminum. The case 251 may be a polymer material which may be reinforced, for example by glass or graphite fibers, to provide the necessary mechanical properties. The case 251 may be composed of two or more layers of different materials which are not shown in FIG. 2.

The propellant material 254 may be a solid fuel propellant material. The propellant material 254 may be, for example, a composite propellant material such as a hydroxl-terminated polybutadiene (HTPD) binder containing ammonium perchlorate oxidizer particles and aluminum fuel particles. The propellant material 254 may be, for further example, a double-base propellant material composed primarily of nitroglycerine and nitrocellulose.

Figure 4A:
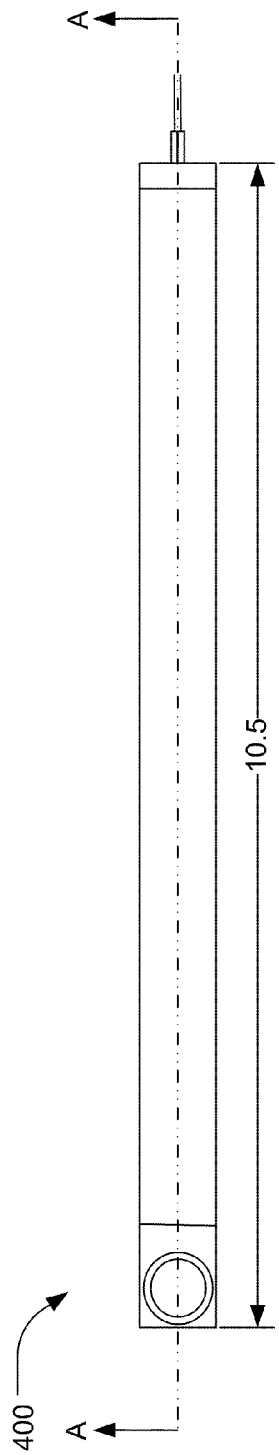
FIG. 4A is a side view of an exemplary solid fuel rocket motor using castellated grain segments.
Figure 4B:
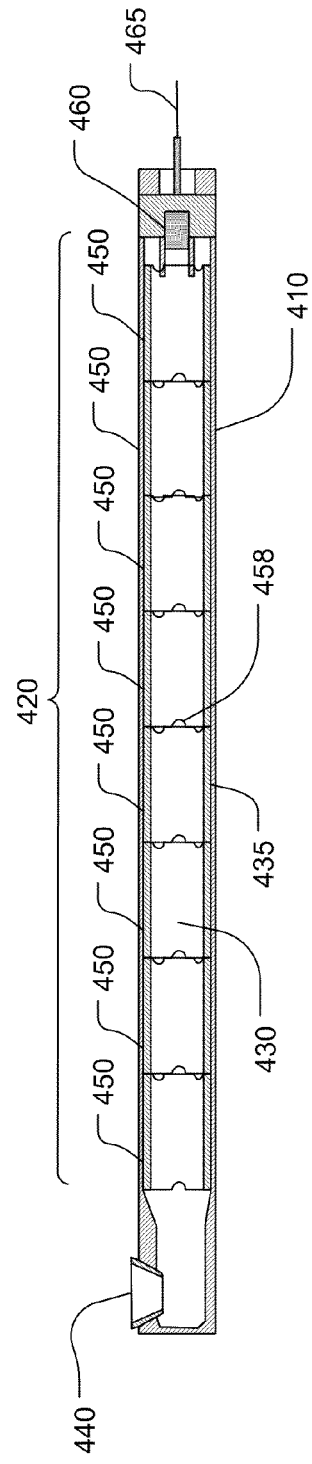
FIG. 4B is a cross sectional view of the exemplary solid fuel rocket motor of FIG. 4A.

FIG. 4A and FIG. 4B are side and cross-sectional views of an exemplary rocket motor 400 including a grain 420 consisting of a plurality of castellated propellant cartridges 450. The rocket motor 400 may be a pitch-over thruster having a nozzle 440 disposed to exhaust combustion gases in a direction generally perpendicular to the long axis of the rocket motor 400.

The exemplary rocket motor 400 may include a generally cylindrical housing 410 about 10.5 inches in length and 0.75 inches in diameter. The housing 410 may be constructed of an aluminum alloy or other metal material. Although the housing 410 is shown in FIG. 4B as a single piece, the housing 410 may be comprised of multiple pieces connected, for example, by threaded joints. The rocket motor 400 may include an igniter 460 that may be ignited by means of an electric current applied to lead wires 465. The exemplary rocket motor 400 may include a grain 420 comprising eight castellated propellant cartridges 450. A rocket motor may include more or fewer than eight propellant cartridges. A common longitudinal cavity 430 may pass through all eight propellant cartridges. Each of the propellant cartridges, for example, may be the propellant cartridge 250 of FIG. 2.

In the example of FIG. 4A and FIG. 4B, there may be four castellations, or notches, at each end of each of the eight propellant cartridges 450. The castellations may allow combustion gases to flow from the longitudinal cavity 430 to interstitial spaces 435 between the propellant cartridges 450 and the housing 410. The total number of castellations and/or the cross-sectional area of each castellation may be selected to limit a difference in gas pressure, or pressure differential, between the longitudinal cavity 430 and the interstitial spaces 435. The total cross-sectional area of all of the castellations may be selected to limit the pressure differential to less than a predetermined maximum pressure. The predetermined maximum pressure may depend on the size of the propellant cartridges 450, the material and structure of the case of each propellant cartridge, the type and thickness of the propellant material within each propellant cartridge, and other parameters. The maximum pressure and the size and number of castellations may be determined by analysis, simulation, experimentation, or a combination thereof.

Test motors were constructed generally as shown in FIG. 4A and FIG. 4B including sensors to measure the gas pressure differential between the central cavity 430 and the interstitial spaces between the outside surfaces of the propellant cartridges 450 and the interior surface of the housing 410. Three test motors using non-castellated propellant cartridges were fired. The peak pressure differential ranged from 750 to 1200 pounds per square inch (psi), which may be a sufficient pressure differential to damage at least some propellant cartridges and possibly cause the rocket motor to fire erratically or to fail. Three test motors using castellated propellant cartridges as shown in FIG. 2 were fired. The peak pressure differential of the test motors with castellated propellant cartridges ranged was 300 to 400 psi, indicating that the castellations are effective in reducing the pressure differential.

In the rocket motor 400, all of the propellant cartridges 450 are identical and have castellations at both ends. Using identical propellant cartridges castellated at both ends may simplify assembly of the rocket motor 400 since the propellant cartridges 450 may be loaded into the housing 410 in any order and in any direction. However, a rocket motor may be constructed using non-identical propellant cartridges. For example, a rocket motor may be constructed using alternating castellated and non-castellated propellant cartridges, in which case the propellant cartridges may be loading into a housing in a particular order. A rocket motor may be constructed using identical propellant cartridges that are castellated at one end only, in which case each propellant cartridge may be oriented in a particular direction for loading into a housing.

Description of Processes

Figure 5:
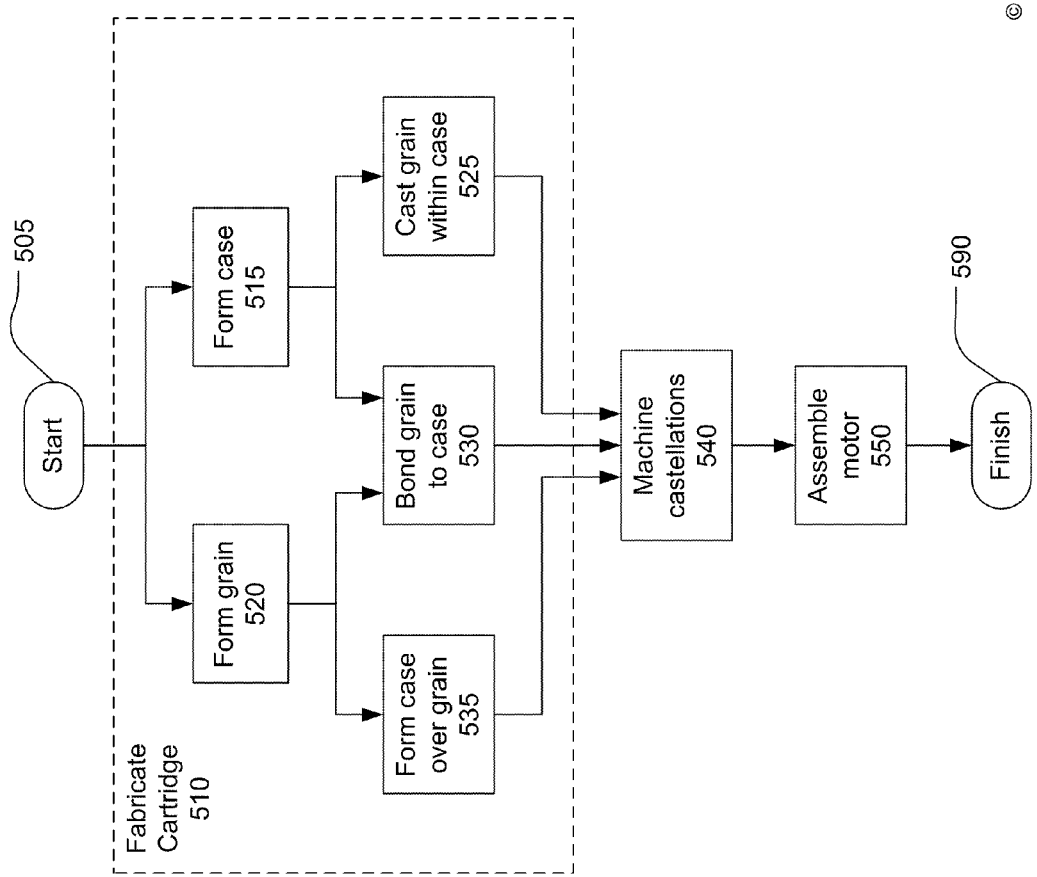
FIG. 5 is a flow chart of a process for constructing a rocket motor.

Referring now to FIG. 5, a process 500 for fabricating a solid fuel rocket motor may start at 505 and finish at 590. One or more propellant cartridges may be fabricated at 510. The propellant cartridges may be fabricated in several different manners.

A first method of fabricating a propellant cartridge may be to form a case at 515 and to form a propellant grain at 520. The propellant grain may then be bonded or otherwise attached within the case at 530. The case may be formed at 515 of a metal material such as an aluminum alloy, titanium, molybdenum, a molybdenum alloy such as TZM (titanium-zirconium-molybdenum) or other metal material. The case may be formed at 515 of a non-metallic material such as a filled or reinforced polymer material. The case may be formed, for example, by extrusion, casting, machining, or other manufacturing process and combinations thereof. The propellant grain may be formed at 520 by casting or molding a finished shape, or by machining a cast or molded pre-form, or by some other process.

A second method of fabricating a propellant cartridge may be to form a case at 515 as previously described and then cast or otherwise form the propellant grain directly within the case at 525.

A third method of fabricating a propellant cartridge may be to form a propellant grain at 520 as previously described and then forming the case directly over the propellant grain at 535. The case may be formed, for example, by wrapping the grain with glass or graphite fiber cloth and then impregnating the wrapping with epoxy resin or some other polymer material.

Some other process may be used at 510 to form a propellant cartridge. The process at 510 may be repeated until a necessary number of propellant cartridges have been fabricated. At 540, castellations may be machined into one or both ends of some or all of the propellant cartridges. The castellations may be machined, for example, by milling or grinding or some other machining process.

At 550, the rocket motor may be assembled. Assembling the rocket motor at 550 may include fabricating or procuring other components of the motor such as an igniter, a nozzle, and one or more parts of a housing. Assembling the rocket motor at 550 may include, for example, mounting the igniter on an end cap portion of the housing, attaching the end cap to a cylindrical barrel portion of the housing, inserting the propellant cartridges fabricated at 510 into the cylindrical barrel, attaching a nozzle to the cylindrical barrel, and assembling other components as necessary. The rocket motor assembled at 540 may include these and other components which may be assembled in any appropriate order. The components of the rocket motor may be assembled at 540 by means of thread interfaces, but may also be assembled using fasteners; by welding, brazing, and other attachments techniques; and combinations thereof.

Closing Comments

Throughout this description, the embodiments and examples shown should be considered as exemplars, rather than limitations on the apparatus and procedures disclosed or claimed. Although many of the examples presented herein involve specific combinations of method acts or system elements, it should be understood that those acts and those elements may be combined in other ways to accomplish the same objectives. With regard to flowcharts, additional and fewer steps may be taken, and the steps as shown may be combined or further refined to achieve the methods described herein. Acts, elements and features discussed only in connection with one embodiment are not intended to be excluded from a similar role in other embodiments.

As used herein, "plurality" means two or more. As used herein, a "set" of items may include one or more of such items. As used herein, whether in the written description or the claims, the terms "comprising", "including", "carrying", "having", "containing", "involving", and the like are to be understood to be open-ended, i.e., to mean including but not limited to. Only the transitional phrases "consisting of" and "consisting essentially of", respectively, are closed or semi-closed transitional phrases with respect to claims. Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements. As used herein, "and/or" means that the listed items are alternatives, but the alternatives also include any combination of the listed items.

It is claimed:

1. A solid fuel rocket motor comprising:
a cylindrical housing having an inside surface;
a plurality of propellant cartridges disposed within the housing;
an igniter disposed to ignite propellant material within the propellant cartridges; and
a nozzle disposed to exhaust combustion gases out of the housing,
wherein at least some of the propellant cartridges are castellated propellant cartridges;
wherein the propellant cartridges are annular propellant cartridges each having an annular first cartridge end and an annular second cartridge end, with each of the annular cartridge ends bordered by a cylindrical inner surface of the propellant cartridge, and a cylindrical outer surface of the propellant cartridge;
wherein the castellated propellant cartridges each have castellations at one or both of the first cartridge end and the second cartridge end;
wherein the castellations each extend from the cylindrical inner surface to the cylindrical outer surface; and
wherein most of the flow from combustion of the propellant is from combustion along the inner surfaces of the propellant cartridges, which goes longitudinally past the inner surfaces of the cartridges, and through the nozzle;
wherein each propellant cartridge comprises an open-ended essentially cylindrical case having an outer surface, an inner surface, a first end, and a second end; and an annular cylinder of propellant material having an outside surface and a longitudinal cavity, the outside surface proximate to the inside surface of the case; and
wherein a total cross-sectional area of the castellations of the plurality of propellant cartridges is sufficient to reduce a maximum pressure differential between a pressure within the longitudinal cavity and a pressure within interstitial spaces between the outside surfaces of the propellant cartridges and the inside surface of the housing to less than a predetermined maximum pressure value; wherein the castellations reduce the maximum pressure differential to 400 psi or less.

2. The solid fuel rocket motor of claim 1, wherein the longitudinal cavity has an essentially circular cross sectional area that tapers along a length of the propellant cartridge.

3. The solid fuel rocket motor of claim 1, wherein the castellations are radial notches having a cross-sectional shape selected from essentially semi-circular, essentially square, and essentially triangular.

4. The solid fuel rocket motor of claim 1, wherein the plurality of propellant cartridges are essentially identical castellated propellant cartridges.

5. The solid fuel rocket motor of claim 4, wherein each propellant cartridge is castellated at both of the first cartridge end and the second cartridge end.

6. The solid fuel rocket motor of claim 4, wherein each propellant cartridge is castellated at one of the first cartridge end and the second cartridge end, and the castellated propellant cartridges are disposed within the housing in a predetermined orientation.

7. The solid fuel rocket motor of claim 1, wherein the plurality of propellant cartridges includes both castellated propellant cartridges and non-castellated propellant cartridges.

8. The solid fuel rocket motor of claim 7, wherein the castellated propellant cartridges alternate with non-castellated propellant cartridges.

9. The solid fuel rocket motor of claim 1, wherein the case is made of a metal material.

10. The solid fuel rocket motor of claim 9, wherein the metal material is aluminum.

11. The solid fuel rocket motor of claim 1, wherein the case is made of a polymer material that is reinforced by glass or graphite fibers.

12. The solid fuel rocket motor of claim 1, wherein, for each of the propellant cartridges, the propellant material is coupled to the case by an adhesive.

13. The solid fuel rocket motor of claim 1, wherein, for each of the propellant cartridges, a length of the propellant cartridge in a longitudinal axial direction is greater than a diameter of the propellant cartridge.

14. The solid fuel rocket motor of claim 1, wherein the castellations reduce the maximum pressure differential from at least 750 psi, for a corresponding solid fuel rocket motor without the castellations.

15. The solid fuel rocket motor of claim 1, wherein the castellations are grooves, slots, or notches extending in a solely radial direction.

16. The solid fuel rocket motor of claim 1, wherein the castellations are indentations in one or both of the cartridge ends of the castellated propellant cartridges, with the indentations being along less than half of a circumference the one or both cartridge ends that have the castellations.

17. The solid fuel rocket motor of claim 16, wherein the castellations are grooves, slots, or notches extending in a solely radial direction.

* * * * *